S. J. MILLER, W. M. MORLOCK & P. G. CARLSON.
COLLAR IRONING, DAMPENING, FOLDING, AND SHAPING MACHINE.
APPLICATION FILED MAR. 25, 1907.
916,178.
Patented Mar. 23, 1909.
4 SHEETS—SHEET 2.
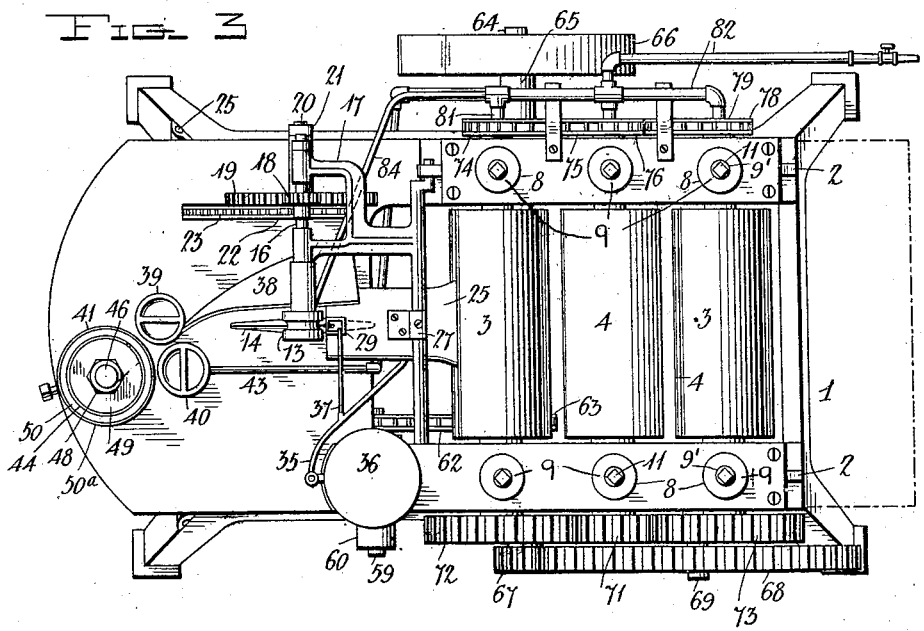
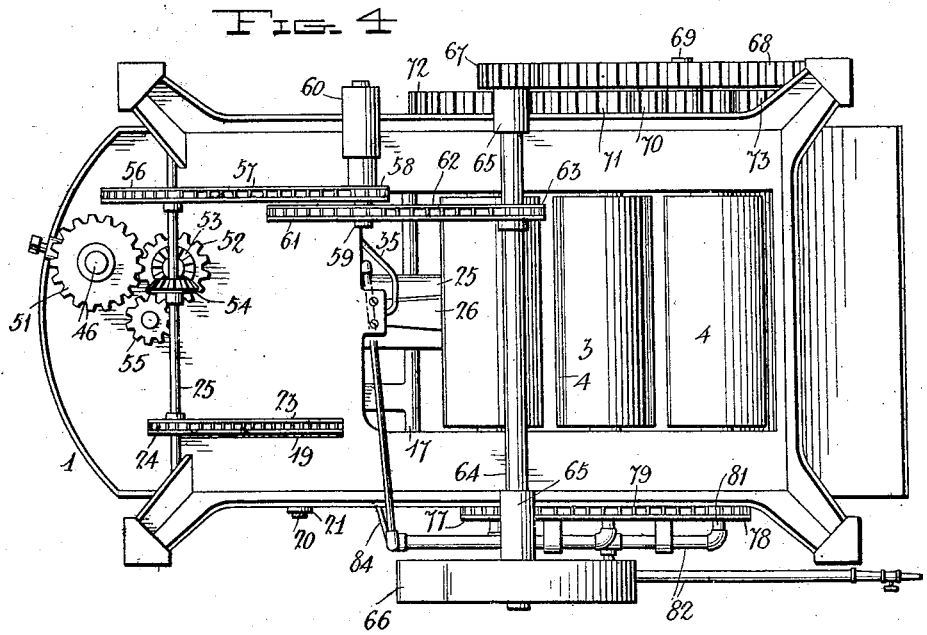
Witnesses
Inventors
Stephen J. Miller,
W. M. Morlock and P. G. Carlson
by H. B. Willson &Co.
Attorneys S. J. MILLER, W. M. MORLOCK & P. G. CARLSON.
COLLAR IRONING, DAMPENING, FOLDING, AND SHAPING MACHINE.
APPLICATION FILED MAR. 25, 1907.
916,178.
Patented Mar. 23, 1909.
4 SHEETS—SHEET 3.
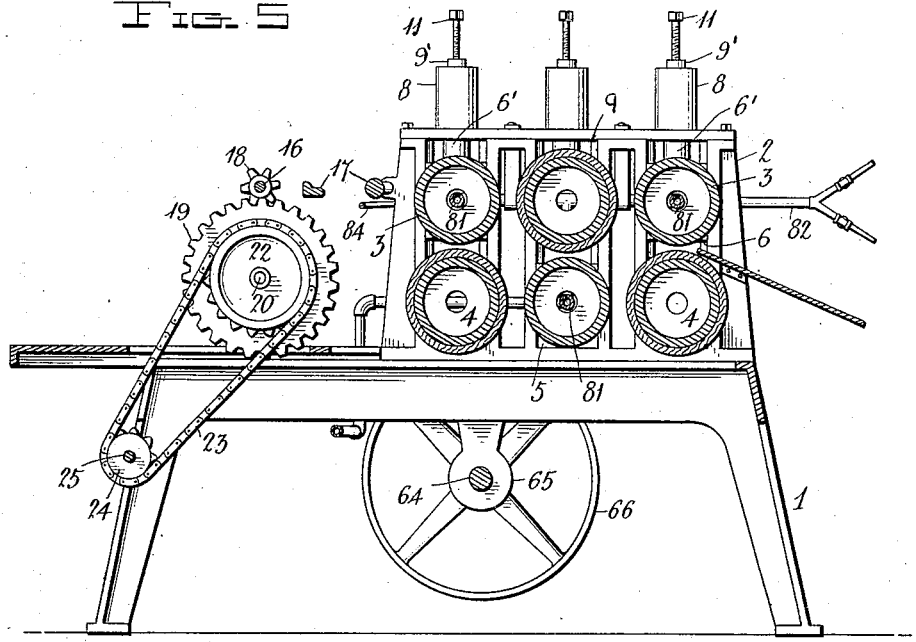
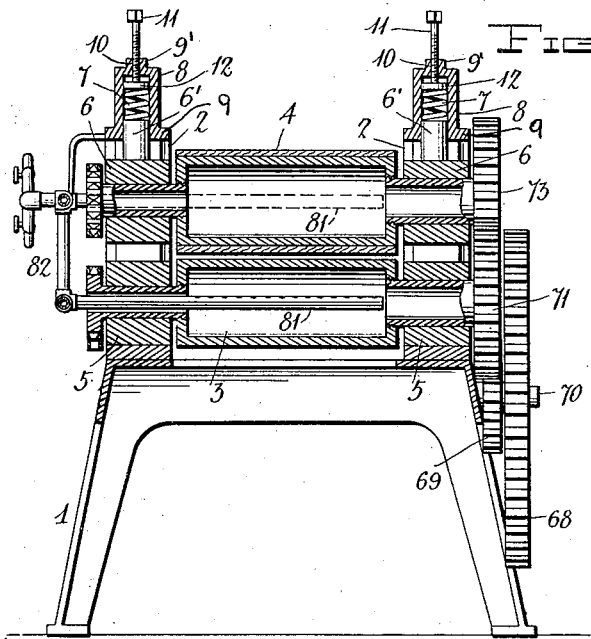
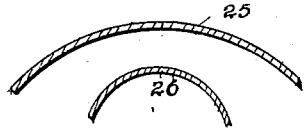
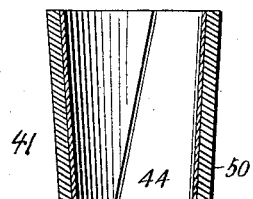
Witnesses
Inventors
Stephen J. Miller
W. M. Morlock and P. G. Carlson
by
Attorneys

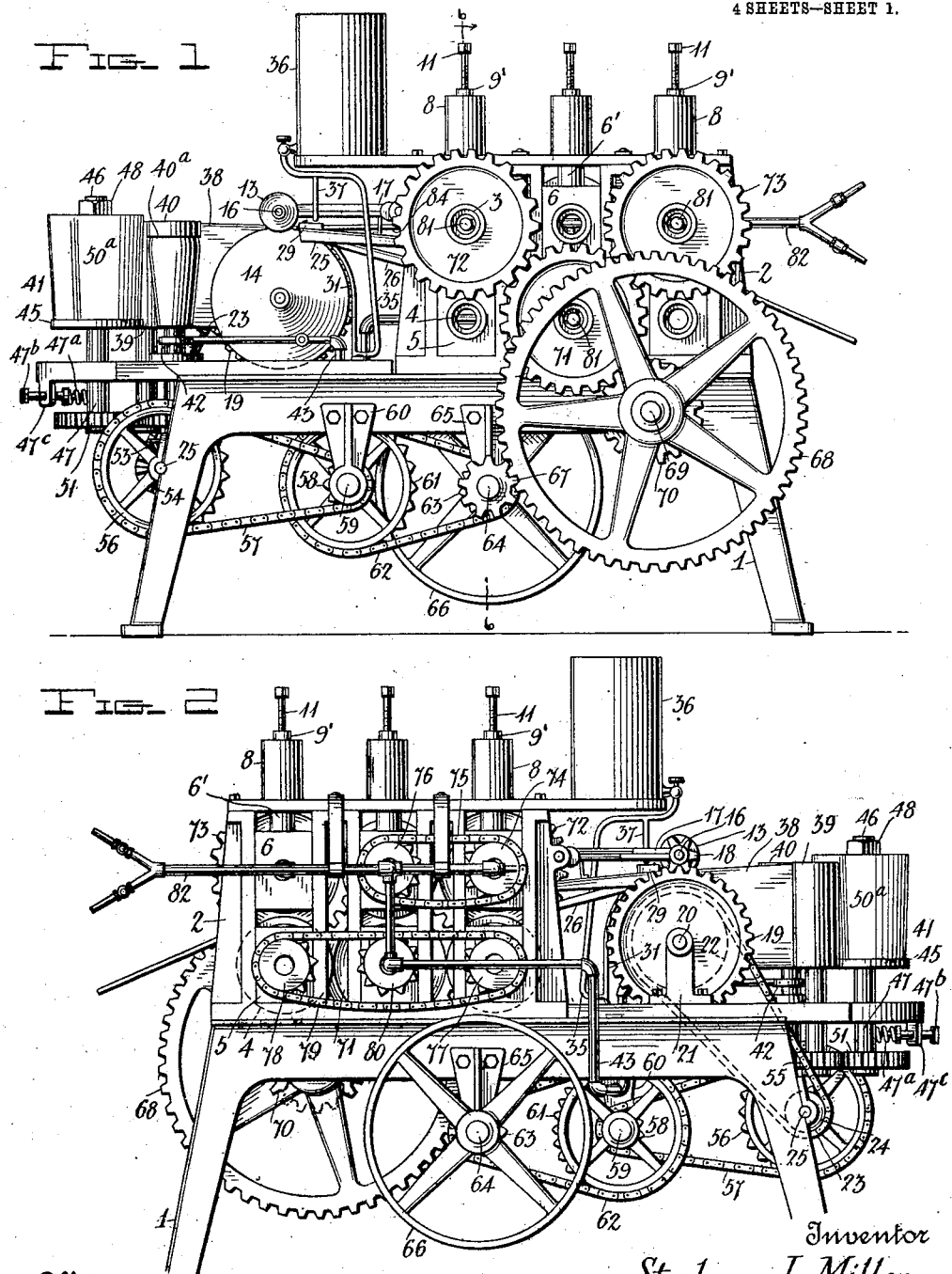

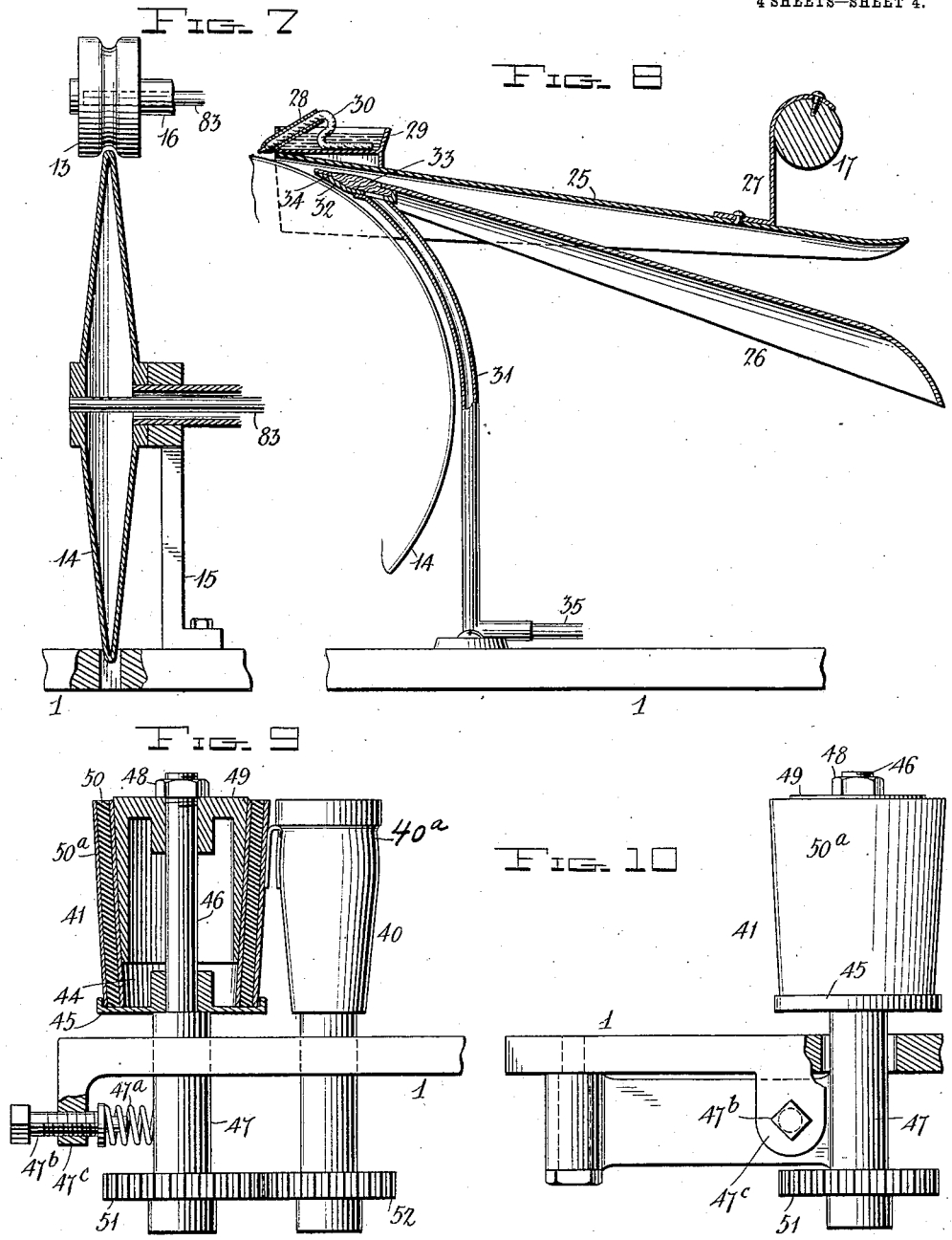

UNITED STATES PATENT OFFICE.

STEPHEN J. MILLER, WILLIAM M. MORLOCK, AND PHAR GUSTAF CARLSON, OF DANBURY, CONNECTICUT; SAID CARLSON ASSIGNOR OF FOUR AND ONE-SIXTH ONE-HUNDREDTHS TO SAID MILLER AND FOUR AND ONE-SIXTH ONE-HUNDREDTHS TO SAID MORLOCK.

COLLAR IRONING, DAMPENING, FOLDING, AND SHAPING MACHINE.

No. 916,178.  Specification of Letters Patent.  Patented March 23, 1909.

Application filed March 25, 1907. Serial No. 364,483.

*To all whom it may concern:*

Be it known that we, STEPHEN J. MILLER, WILLIAM M. MORLOCK, and PHAR GUSTAF CARLSON, citizens of the United States, residing at Danbury, in the county of Fairfield and State of Connecticut, have invented certain new and useful Improvements in Collar Ironing, Dampening, Folding, and Shaping Machines; and we do declare the following to be a full, clear, and exact description of the invention, such as will enable others skilled in the art to which it appertains to make and use the same.

This invention relates to improvements in collar ironing, dampening, folding and shaping machines.

The object of the invention is to provide a machine of this character in which both sides of a collar are quickly ironed, and by means of which turnover collars are folded and shaped without cracking or injuring the same.

With this object in view, the invention consists of certain novel features of construction, combination and arrangement of parts as will be more fully described and particularly pointed out in the appended claims.

In the accompanying drawings, Figure 1 is a side elevation of one side of the machine; Fig. 2 is a similar view of the opposite side; Fig. 3 is a top plan view; Fig. 4 is a bottom plan view; Fig. 5 is a central vertical longitudinal sectional view; Fig. 6 is a vertical sectional view on the line 6—6 of Fig. 1; Fig. 7 is a detail vertical sectional view through the folding rolls; Fig. 8 is a similar view of the moisture applying or dampening devices, and guides for the collar. Fig. 9 is a detail sectional view through a portion of the frame or table of the machine and the final shaping roll; Fig. 10 is a similar view taken at right angles to Fig. 9; and Fig. 11 is a detail vertical sectional view through the open expansible tube or shell of the final shaping roll showing the rubber band or ring. Fig. 12 is a cross sectional view through the guiding plates.

Referring more particularly to the drawings, 1 denotes the supporting frame or table, on one end of which is arranged a series of bearing standards, 2, in which are journaled a series of ironing rolls, of which there may be any desired number, said rolls being arranged in pairs. In the present instance, three pairs of ironing rolls are shown the rolls of each of said pairs being mounted one above the other in the standards, 2. Each pair of rolls consists of a heated roll, 3, and a padded roll, 4, the arrangement of said heated and padded rolls being reversed in each alternate pairs of rolls. The upper rolls of the outer sets are here shown as heated rolls, while in the intermediate set or pair the lower roll is shown as the heated roll. The lower rolls of the outer pairs and the upper roll of the intermediate pair are padded rolls. By this arrangement it will be seen that the outer side of the collar will be twice ironed by said upper heated rolls of the outer pairs while the inner side of the collar is ironed but once by the lower heated roll of the intermediate pair.

The lower rolls of each pair are journaled in bearing boxes, 5, which are fixedly mounted in the lower ends of the standards, 2. The upper rolls of each of said pairs are journaled in bearing boxes, 6, which are slidably mounted in the bearing standards, 2, as shown, thereby permitting said upper rolls to be brought into engagement with the lower rolls with more or less pressure, as may be desired. In order that the upper rolls may be held in yielding engagement with the lower rolls with sufficient pressure to iron the collars passed between said rolls, the bearing boxes, 6, of the upper rolls are adapted to be engaged by coiled pressure springs, 7, which are disposed in cylindrical caps, or boxes, 8, arranged on and preferably cast integral with plates, 9, adapted to be screwed to the upper ends of the standards, 2 as shown. On the upper ends of the caps, or boxes, 8, are formed bosses, 9', in which and through the upper ends of the caps is formed a threaded passage or bolt hole, 10, in which is adapted to be screwed adjusting bolts, 11, the ends of which are adapted to engage tension blocks, or plates, 12, arranged in the boxes, 8, on the upper ends of the springs, 7. The lower ends of the springs 7 rest on cylindrical guide blocks, 6', formed on the upper side of the bearing boxes, 6. The tension of the springs 7 is thus normally exerted to force the bearing boxes 6 downwardly, thereby holding the upper ironing rolls into tight engagement with the lower ironing rolls. The tension of the springs 7, and thereby the degree of pressure exerted by the upper rolls on the lower rolls, is regulated by means of the adjusting screws, 11, in the upper ends of the boxes or caps, 8.

On the table or frame, 1, in advance of the ironing rolls is arranged upper and lower collar folding rolls, 13 and 14, the lower roll, 14, being preferably in the form of a hollow disk, the walls of which taper or incline inwardly from the center toward the outer edges or periphery of the disk as shown. The lower roll is revolubly mounted in a stationary bearing bracket, 15, secured to the table or frame, 1, as shown. The upper roll, 13, is fixedly mounted upon the inner end of a shaft, 16, which is revolubly mounted in bearings formed on the outer end of an arm or bracket, 17. The arm or bracket 17 is preferably hinged or pivotally connected to the adjacent end of the bearing standards, 2, whereby said arm or bracket together with the upper folding roll may be lifted or swung upwardly when desired. On the shaft, 16, is also fixedly mounted a spur gear pinion, 18, which, when the bracket 17 is in a lowered position, is adapted to engage a gear wheel, 19, which is fixedly mounted on a stub shaft, 20, journaled in suitable bearings, 21, on the table or frame 1 of the machine. On the shaft 20 is also fixedly mounted a sprocket wheel, 22, which is connected by a sprocket chain, 23, to the sprocket wheel, 24, on the driving shaft 25 journaled in suitable bearings on the supporting frame of the machine, beneath the table, 1.

Between the folding rolls, 13 and 14, and the ironing rolls are arranged upper and lower guide plates, 25 and 26, said plates being preferably curved in cross section as is shown clearly in Figs. 8 and 12, and the upper plate 25 is held in position by a suitable bracket, 27, secured to brackets, 17, as shown in Figs. 3 and 8, and the lower plate on a pipe 31, hereinafter described. The inner ends of the plates 25 and 26 are disposed opposite and adjacent to the inner pair of ironing rolls, whereby a collar after passing between said rolls enters between the guide plates, and is conducted by them to the folding rolls.

Arranged at the outer ends of the guide plates, 25 and 26 is a suitable dampening mechanism, by means of which the seam or folding line of the collar is dampened to facilitate the folding of the collar and avoiding all danger of a stiff collar being cracked or broken by folding. The dampening mechanism consists of an upper moisture applying tube, 28, arranged on the outer end of a water pan, 29, which is fixedly mounted on the outer side of the upper guide plate, 25, adjacent to its outer end as shown in Fig. 8. The tube 28 is provided with a moisture conducting wick, 30, one end of which lies in the water pan, 29, while the opposite end extends through the tube 28 and projects a slight distance beyond the outer end thereof in position to engage the upper side of the collar immediately before the same passes between the folding rolls. The outer end of the tube, 28 is preferably tapering, so that the size of the wick is reduced when brought through said ends of the tube in position to engage the collar.

The lower dampening device consists of a curved upwardly projecting water conducting tube, 31, having on its upper end a hollow head, 32, the upper side of which is open and has arranged therein a piece of moisture conducting material, 33, which may be in the form of a sponge or piece of absorbent felt, said moisture conducting material being adapted to project through a slot, 34, in the lower guide plate, 26, in position to engage the seam or folding line on the under side of the collar immediately before the same is passed through the folding rolls. The tube 31 is provided at its lower end with an elbow, by means of which the same is connected with the lower end of a feed pipe, 35, the upper end of which is connected to a water supply tank, 36, arranged on an extension of one of the plates 9, as shown. The water pan, 29, is supplied with water from the tank, 36, by means of a feed pipe, 37, which, if desired, may be a branch of the feed pipe, 35, that supplies the lower dampening device.

The collars after being operated on by the folding rolls are engaged by a series of feeding and shaping rolls arranged on the adjacent end of the machine. When the collar leaves the folding rolls it is directed by a suitable guide plate, 38, to the inner pair of feeding rolls, 39 and 40. The roll, 40, acts as an inner shaping roll as well as a feeding roll, said rolls, 39 and 40, feeding the collar to the final shaping roll, 41, which is revolubly mounted on the table, 1, adjacent to the rolls 39 and 40. The roll 40 is preferably heated by a suitable gas burner, 42, connected to a gas supply pipe, 43. The roll 41 consists of a split band or sleeve, 44, which is supported on its lower end upon a flanged disk, 45, said disk being fixedly mounted upon a stem or shaft, 46, which is journaled in a bearing bracket, 47, pivotally mounted on the under side of the table, 1, as shown. The bearing bracket, 47, is adapted to be engaged by a pressure spring, 47$^a$, which is arranged on the end of an adjusting bolt, 47$^b$, which is engaged with a threaded hole formed in a depending lug, 47$^c$, on the adjacent end of the table or frame of the machine. The spring, 47$^a$, holds the final shaping roll into yielding engagement with the shaping roll 40, so that the folded collars will be creased and shaped by the pressure of said rolls when passing between the same.

The stem or shaft, 46, projects upwardly through a slot in the table, 1, and is provided on its upper end with screw threads, upon which is adapted to be screwed a clamping nut, 48. In the split band or sleeve, 44, is adapted to be inserted a tapered expanding core, 49, said core being preferably in the form of an inverted cup, and is provided in its closed end with a centrally disposed passage through which the stem or shaft 46 projects, and by means of which the core, 49, is capable of adjustment on said shaft. The core, 49, is adapted to be adjusted on the shaft 46 to expand the band or sleeve, 44, to a greater or less degree by means of the clamping nut 48 which is screwed on the threaded upper end of the shaft and into engagement with the closed upper end of the core 49 as shown. Around the band or sleeve 44 is adapted to be placed an elastic band or covering of soft rubber, 50, which is stretched or contracted with the sleeve 44 as the latter is expanded or contracted by the movement of the core, 49, thereby providing for the adjustment of the shaping roll, 41, to engage collars of different sizes. Around the rubber band, 50, on the sleeve 44 is adapted to be placed a soft canvas or other fabric band, 50ª.

The shaping roll, 40, tapers toward its lower end and is provided near its upper end with an annular groove, 40ª, to accommodate the thickness of the seam on the inner side of the collar when the latter passes between the rolls 40 and 41, so that the projection caused by the seam will be entirely on the inner side of the collar, thus permitting the outer side to be pressed smooth and flat by the action of the final shaping roll, 41. The shaft, 46, is provided on its lower end with a spur gear, 51, which is engaged and operated by a gear, 52, on the shaft of the roll 40, said shaft also being provided with a bevel gear, 53, which is engaged with a bevel gear, 54, on the shaft, 25. The gear 52 also engages a gear 55 mounted on the lower end of the shaft of the roll, 39, thereby also operating said roll. The shaft 25 is provided with a sprocket wheel 56 which is connected by a sprocket chain 57 to a sprocket pinion 58 on a stud shaft 59, which is journaled in a suitable bearing, 60, on the under side of the frame of the machine. The shaft 59 is also provided with a sprocket gear 61 which is connected by a sprocket chain 62 with a sprocket pinion 63, mounted on the main driving shaft 64, which is journaled in suitable bearings 65 on the under side of the machine. The shaft 64 is provided on one end with a driving pulley 66 and on its other end is fixedly mounted a spur gear pinion 67. The pinion 67 is adapted to engage a driving gear 68 which is mounted on a stud shaft 69 arranged on one side of the machine as shown. The shaft 69 has also fixedly mounted thereon a spur gear pinion 70, with which is engaged a spur gear wheel 71 on the adjacent end of the lower ironing roll at the intermediate pair of rolls, whereby said lower roll is driven. The gear 71 also engages similar gears, 72 and 73, which are mounted on the adjacent ends of the upper rolls of the outer pairs of ironing rolls, as shown. The opposite end of the upper shaft of the inner pair of ironing rolls is provided with a sprocket wheel 74, which is connected by a sprocket chain 75 with a sprocket wheel 76 on the adjacent end of the shaft of the upper roll of the intermediate pair of ironing rolls whereby said upper roll is driven. The adjacent ends of the shafts of the lower rolls of said outer pairs are provided with sprocket wheels, 77 and 78, which are connected together by a sprocket chain, 79, said chain being adapted to engage a sprocket wheel, 80, on the adjacent end of the lower roll of the intermediate pair of ironing rolls, whereby said outer rolls are driven.

The upper rolls of the outer pairs and the lower roll of the intermediate pair of ironing rolls are heated by means of suitable gas burners, 81, which are connected to a gas supply pipe, 82. The upper and lower folding rolls, 13 and 14 are also preferably heated by means of suitable gas burners 83, which are connected to the main gas supply pipe, 82, by a branch supply pipe, 84. By heating the folding rolls 13 and 14, the seam of the collar is quickly dried after being moistened by the dampening mechanism, as herein described.

From the foregoing description, taken in connection with the accompanying drawings, the construction and operation of the invention may be readily understood without requiring a more extended explanation.

Various changes in the form, proportion and the minor details of construction may be resorted to without departing from the principle or sacrificing any of the advantages of this invention as defined in the appended claims.

Having thus fully described our invention, what we claim as new, and desire to secure by Letters-Patent, is:—

1. In a machine of the character described, the combination with a supporting table or frame, of a series of ironing rolls revolubly mounted thereon and arranged in pairs, folding rolls arranged to coöperate with said ironing rolls, shaping rolls arranged adjacent to said folding rolls, a seam dampening device arranged between said ironing rolls and said folding rolls, means whereby said rolls are operated and means whereby certain of the latter are heated, substantially as described.

2. In a machine of the character described, the combination with a supporting table, of a series of ironing rolls revolubly mounted thereon, and arranged in pairs, means for regulating the pressure of said ironing rolls, a seam dampening mechanism, guides arranged between said seam dampening mechanism and said ironing rolls, a plurality of folding rolls, and a plurality of shaping rolls, for folding and shaping the collars after they leave said dampening mechanism.

3. In a machine of the character described, the combination with a supporting table, of bearing frames arranged thereon, stationary and adjustable bearing boxes arranged in said frames, a series of heated, and a series of padded rolls adapted to be revolubly mounted in said bearing boxes, said rolls being arranged in pairs, each pair comprising a heated roll and a padded roll, adjustable pressure mechanism arranged on said bearing frames whereby one of said rolls in each pair is forced into yielding engagement with the other roll of said pair, a seam dampening mechanism, a plurality of folding rolls, and a plurality of shaping rolls revolubly mounted on said table, substantially as described.

4. In a machine of the character described, the combination with a supporting table and dampening mechanism, of bearing frames arranged thereon, stationary and adjustable bearing boxes arranged in said frames, a series of heated rolls and a series of padded rolls revolubly mounted in said bearing boxes, said rolls being arranged in pairs, each pair comprising a heated roll and a padded roll, pressure springs adapted to engage the adjustable bearing boxes of the upper series of rolls whereby the latter are held in operative engagement with the lower series of rolls, adjusting screws to regulate the tension of said pressure springs, a plurality of folding rolls, a plurality of shaping rolls, and means whereby certain of said ironing, folding and shaping rolls are heated, substantially as described 5. In a machine of the character described, the combination with a supporting table, of a series of ironing rolls arranged in pairs and revolubly mounted thereon, a seam dampening mechanism, said mechanism comprising a water pan, a moisture applying wick adapted to be connected with said pan and to engage the upper side of a collar, a water supply pipe having at its upper end a hollow head, a moisture applying pad arranged in said head and adapted to be engaged with the lower side of a collar, and a tank to supply water to said upper and lower moisture applying devices, a pair of folding rolls, and a plurality of feeding and shaping rolls revolubly mounted on said table, substantially as described.

6. In a machine of the character described, the combination with a supporting table, of a series of heated ironing rolls and a series of padded ironing rolls arranged in pairs and revolubly mounted on said table, means whereby the upper roll of each of said pairs is held in yielding engagement with the lower roll, a seam dampening mechanism, guide plates between said seam dampening mechanism and the inner pair of ironing rolls, a folding mechanism, said mechanism comprising a lower hollow disk-shaped roll revolubly mounted upon said table, and an upper annularly grooved folding roll adapted to engage said lower roll, means to support said upper roll to permit the same to be swung upwardly out of engagement from the lower roll, means whereby said rolls are driven, a heating burner adapted to be applied to said lower folding roll, a plurality of feeding and shaping rolls revolubly mounted on said table and a guide plate to direct the collars from said folding rolls to said feeding and shaping rolls, substantially as described.

7. In a machine of the class described, the combination with a supporting table and dampening mechanism, of a series of ironing rolls arranged in pairs and revolubly mounted thereon, intermeshing gears arranged respectively on one end of the upper end rolls of said pairs and on one end of the lower roll of the intermediate pair, a main drive shaft, a gear pinion on said shaft meshing with one of said intermeshing gears whereby the latter are driven, sprocket gears arranged on the opposite ends of several of said rolls, sprocket chains connecting said gears whereby the remaining rolls of said series are driven, folding rolls adapted to be driven by said main drive shaft, a plurality of shaping and feeding rolls geared together at their lower ends, a counterdrive shaft geared to and adapted to operate said feeding and shaping rolls and a sprocket gear connection between said counter-drive shaft and main shaft, whereby the former is driven.

8. In a machine of the character described, the combination with a supporting table, of a series of ironing rolls arranged in pairs and revolubly mounted thereon, a pair of revolubly mounted folding rolls, a dampening mechanism arranged between said folding rolls and the adjacent pair of ironing rolls, a collar shaping mechanism, said mechanism comprising an inner pair of vertically disposed rolls revolubly mounted on said table, one of said inner pair of rolls being tapered inwardly toward its lower end and provided adjacent to its upper end with an annular groove to receive the seam on the inner side of a collar, means whereby said tapered roll is heated, and a final shaping roll adapted to co-act with the said tapered roll, substantially as described.

9. In a machine of the character described, the combination with a supporting table, of a series of ironing rolls arranged in pairs and revolubly mounted thereon, a pair of revolubly mounted folding rolls, a dampening mechanism arranged between said folding rolls and the adjacent pair of ironing rolls, a collar shaping mechanism, said mechanism comprising an inner pair of vertically disposed rolls revolubly mounted on said table, one of said inner pair of rolls being tapered inwardly toward its lower end and provided adjacent to its upper end with an annular groove to receive the seam on the inner side of a collar, means whereby said tapered roll is heated, a final shaping roll adapted to co-act with said tapered roll, said final shaping roll comprising an adjustably mounted shaft, an annular supporting disk fixed on said shaft above said table, an expansible sleeve or band arranged on said disk, an expanding cone adjustably mounted on said shaft, means to adjust said cone to expand said sleeve, an elastic band arranged around said sleeve, and a soft fabric band arranged around said elastic band, substantially as described.

10. In a machine of the character described, the combination with a supporting table, of a series of ironing rolls arranged in pairs and revolubly mounted thereon, a pair of revolubly mounted folding rolls, a dampening mechanism arranged between said folding rolls and adjacent pair of ironing rolls, a collar shaping mechanism, said mechanism comprising an inner pair of vertically disposed rolls revolubly mounted on said table, one of said inner pair of rolls being tapered inwardly toward its lower end and provided adjacent to its upper end with an annular groove to receive the seam on the inner side of a collar, means whereby said tapered roll is heated, a final shaping roll, said roll comprising a vertically disposed shaft adapted to project through a slot in the supporting table of the machine, an arm or bracket pivotally mounted on the under side of said table to revolubly support said shaft, a flanged disk fixed on said shaft above said table, an expansible band or sleeve arranged on said disk, a soft elastic rubber band around said sleeve, a flexible fabric band around said rubber band, an expanding core adapted to be inserted into said expansible sleeve, an adjusting nut adapted to be screwed onto the upper end of said shaft into engagement with said core whereby, the latter is forced into said sleeve, a pressure spring adapted to be applied to the supporting bracket or arm of said expanding roll, whereby the latter is held in yielding engagement with said tapered, shaping roll, means to adjust said spring, a main drive shaft, and a system of gearing, whereby said ironing rolls, folding rolls and shaping rolls are operatively connected to said shaft, substantially as described.

11. In a machine of the character described, the combination with a supporting table, of a series of revolubly mounted ironing rolls arranged thereon, a seam dampening mechanism, a lower collar folding roll revolubly mounted in stationary bearings on said table, an upper collar folding roll to co-act with said lower roll, a hinged bearing arm or bracket having on its outer end journal bearings to revolubly support said upper collar folding roll whereby the same may be lifted out of engagement with said lower roll upper and lower guide plates to conduct the collar from said ironing rolls to said folding rolls, a plurality of vertically disposed feeding and shaping rolls, revolubly mounted on said table, said rolls comprising an inner pair of rolls, one of which is tapered and heated, an expansible, adjustably mounted final shaping roll to co-act with said tapered roll, and a guide plate to conduct the collars from said folding rolls to said feeding and shaping rolls, substantially as described.

In testimony whereof we have hereunto set our hands in presence of two subscribing witnesses.

STEPHEN J. MILLER.
WILLIAM M. MORLOCK.
PHAR GUSTAF CARLSON.

Witnesses:
WM. M. DAYTON,
HORACE PURDY.